US008438189B2

(12) United States Patent
Andersen et al.

(10) Patent No.: US 8,438,189 B2
(45) Date of Patent: May 7, 2013

(54) LOCAL COMPUTATION OF RANK CONTRIBUTIONS

(75) Inventors: Reid Marlow Andersen, Seattle, WA (US); Christian Herwarth Borgs, Seattle, WA (US); Jennifer Tour Chayes, Seattle, WA (US); Krishna C. Gade, Redmond, WA (US); John E. Hopcroft, Ithaca, NY (US); Vahab Mirrokni, Seattle, WA (US); Shang-Hua Teng, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 1386 days.

(21) Appl. No.: 12/124,239

(22) Filed: May 21, 2008

(65) Prior Publication Data

US 2009/0030916 A1 Jan. 29, 2009

Related U.S. Application Data

(60) Provisional application No. 60/951,403, filed on Jul. 23, 2007.

(51) Int. Cl.
*G06F 7/00* (2006.01)
*G06F 17/30* (2006.01)
(52) U.S. Cl.
USPC .......................... 707/800; 707/705; 707/798
(58) Field of Classification Search .................. 707/705, 707/798, 800
See application file for complete search history.

(56) References Cited

U.S. PATENT DOCUMENTS

| 2005/0033742 | A1* | 2/2005 | Kamvar et al. | 707/7 |
|---|---|---|---|---|
| 2006/0095416 | A1* | 5/2006 | Barkhin et al. | 707/3 |
| 2006/0271564 | A1* | 11/2006 | Meng Muntz et al. | 707/100 |
| 2008/0091834 | A1* | 4/2008 | Norton | 709/229 |
| 2008/0243812 | A1* | 10/2008 | Chien et al. | 707/5 |
| 2009/0222435 | A1* | 9/2009 | Andersen et al. | 707/5 |

OTHER PUBLICATIONS

Andersen, R. et al., "Local Computation of PageRank Contributions", WAW Dec. 11-12, 2007 San Diego, CA, USA.*
Andersen, et al. Local Graph Partitioning Using Pagerank Vectors. Proceedings of the 47th Annual IEEE Symposium on Foundations of Computer Science (FOCS'06). pp. 475-486, Washington, DC, USA, 2006. IEEE Computer Society. 0-7695-2720-5/06 IEEE. http://ieeexplore.ieee.org/iel5/4031329/4031330/04031383.pdf?tp=&isnumber=&arnumber=4031383. Last accessed Aug. 26, 2008, 9 pages.

(Continued)

*Primary Examiner* — Wilson Lee
*Assistant Examiner* — Jessica N Le
(74) *Attorney, Agent, or Firm* — Lee & Hayes, PLLC

(57) ABSTRACT

The claimed subject matter relates to an architecture that can identify, store, and/or output local contributions to a rank of a vertex in a directed graph. The architecture can receive a directed graph and a parameter, and examine a local subset of vertices (e.g., local to a given vertex) in order to determine a local supporting set. The local supporting set can include a local set of vertices that each contributes a minimum fraction of the parameter to a rank of the vertex. The local supporting set can be the basis for an estimate of the supporting set and/or rank of the vertex for the entire graph and can be employed as a means for detecting link or web spam as well as other influence-based social network applications.

20 Claims, 8 Drawing Sheets

OTHER PUBLICATIONS

Berkhin. Bookmark-coloring algorithm for personalized pagerank computing. In: Internet Mathematics vol. 3, No. 1: 41-62. http://www.internetmathematics.org/volumes/3/1/Berkhin.pdf. Last accessed Aug. 26, 2008, 22 pages.

Brin, et al. The Anatomy of a Large-Scale Hypertextual Web Search Engine. In: Computer Networks and ISDN Systems, 30(1-7):107-117, 1998. http://citeseerx.ist.psu.edu/viewdoc/summary?doi=10.1.1.109.4049. Last accessed Aug. 28, 2008, 25 pages.

Benczur, et al. Spam Rank—Fully Automatic Link Spam Detection—Work in progress. In First International Workshop on Adversarial Information Retrieval on the Web, 2005. http://citeseerx.ist.psu.edu/viewdoc/summary?doi=10.1.1.59.3551. Last accessed Aug. 28, 2008, 14 pages.

Chen, et al. Local Methods for Estimating PageRank Values. In: CIKM'04, Nov. 8-13, 2004, Washington, D.C., USA. ACM 1-58113-874-1/04/0011. http://delivery.acm.org/10.1145/1040000/1031248/p381-chen.pdf?key1=1031248&key2=0235399121&coll=GUIDE&dl=GUIDE&CFID=873374&CFTOKEN=73754211. Last accessed Aug. 28, 2008, 9 pages.

Gyongyi, et al. Link Spam Detection Based on Mass Estimation. In: VLDB '06, Sep. 12-15, 2006, Seoul, Korea. VLDB Endowment, ACM 1-59593-385-9/06/09. http://infolab.stanford.edu/~zoltan/publications/gyongyi2006link.pdf. Last accessed Aug. 28, 2008, 12 pages.

Jeh, et al. Scaling Personalized Web Search. In : WWW2003, May 20-24, 2003, Budapest, Hungary. pp. 271-279. ACM 1581136803/03/0005. http://portal.acm.org/citation.cfm?id=775191. Last accessed Aug. 28, 2008, 9 pages.

Sarlos, et al. To Randomize or Not to Randomize: Space Optimal Summaries for Hyperlink Analysis. In : WWW 2006, May 23-26, 2006, Edinburgh, Scotland, pp. 297-306. ACM 1595933239/06/0005. http://portal.acm.org/citation.cfm?id=1135777.1135823&CFID=876029&CFTOKEN=59960451. Last accessed Aug. 28, 2008, 10 pages.

Spielman, et al. Nearly-Linear Time Algorithms for Graph Partitioning, Graph Sparsification, and Solving Linear Systems. STOC'04, Jun. 13-15, 2004, Chicago, Illinois, USA. ACM 1-58113-852-0/04/0006. http://portal.acm.org/results.cfm?coll=GUIDE&dl=GUIDE&CFID=876029&CFTOKEN=59960451. Last accessed Aug. 28, 2008, 10 pages.

Hein, James L. "Discrete Mathematics" 2nd edition, published in 2003 by Jones and Bartlett Publisher, pp. 339-342.

Johnsonbaugh, Richard "Discrete Mathematics" 6th edition, published in 2005 by Pearson Prentice Hall, pp. 157-159.

* cited by examiner

LOCAL COMPUTATION OF RANK CONTRIBUTIONS

CROSS-REFERENCE TO RELATED APPLICATIONS

This application claims the benefit of U.S. Provisional Application Ser. No. 60/951,403, filed Jul. 23, 2007, entitled "LOCAL COMPUTATION OF RANK CONTRIBUTIONS." The entirety of this application, including any appendices or attachments, is incorporated herein by reference.

BACKGROUND

Conventionally, most search engines use a link structure among web pages to compute a measure of the importance of each web page, which is generally considered when determining items such as, for example, which web pages will be displayed for a given search query and/or an order of the query results. Typically, the idea is as follows: if a web page has many links from other web pages, then the first web page is most likely an important one. By applying this idea iteratively and recursively, one can compute a score for each web page that is representative of the importance of the page. Two of the best-known algorithms for this purpose are the PageRank algorithm and the hubs and authorities algorithm. In the PageRank algorithm, each web page gets a PageRank score which is equal to the stationary probability of that node or vertex (e.g., web page) in a certain random process: a uniform random walk on the web graph with a restarting probability that is uniform on all nodes of the graph. The PageRank of a web page, v, can be viewed as the sum of the individual contributions to v from each of the other web pages in the graph. Specifically, the contribution of a web page u to the PageRank of a web page v is defined to be the value of the page v in the personalized PageRank vector of the page u.

In many settings, it is important to find the set of web pages that contribute the most to the PageRank of a given page. For example, one difficulty that confronts today's search engines is a malicious and/or fraudulent activity known as "link spam" or "web spam", whereby the rank of a web page assigned by a search engine is increased by manipulating link structure rather than by improving the content of the web page or its appeal to users. For example, many ad hoc yet independent web pages can be created that contain links to one another. As many of these ad hoc web pages can have a large number of other (also potentially ad hoc) web pages that link to the page, conventional search engines are prone to rank such web pages more highly than is otherwise warranted. Today, the most common way to detect web spam is based on the content of the web page, yet such a method can be costly and inefficient.

Efficiently detecting link spam has become increasingly important in maintaining the integrity of search engines. Given one suspicious webpage, one needs a method to quickly identify a set of pages that contributes significantly to the PageRank of that suspicious page, as well as the respective PageRanks of the set of pages to which the suspicious page contributes significantly. We refer to former as the contribution set or the supporting set, and to the latter as the influence set of the suspicious page. Given that the web graph (e.g., a directed graph representative of the entire web) is massive and getting larger at a substantial rate, it can be essential to find these supporting and influence sets by examining as small a fraction of the full graph as possible.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can identify local contributions to a rank of a vertex in a directed graph. In particular, contributions to the rank of a vertex can be thought of as a supporting set for the vertex wherein the total rank of the vertex can be a measure of the importance of that vertex in the graph. However, rather than examining all vertices in the graph in order to determine the supporting set (or the rank), in accordance with an aspect of the claimed subject matter, the architecture can examine a local set of vertices in order to gather an approximation for the aforementioned items. More particularly, the architecture can examine a local subset of the vertices in the graph to ascertain a local supporting set for a given vertex. Furthermore, based upon this local supporting set—which can be determined by examining only local vertices rather than all the vertices in the graph—an approximation of the rank of the vertex can be estimated.

According to an aspect of the claimed subject matter, the architecture can determine the local supporting set and/or rank the vertex by examining at most $O(1/\epsilon)$ vertices, where $\epsilon$ is an error parameter that governs the accuracy of the result. Hence, computations can be performed much more efficiently based upon the size of the local supporting set rather than the size of the entire graph. For example, the architecture can examine a local subset of vertices in a time that is bounded by a sum of in-degrees of the local subset of vertices.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
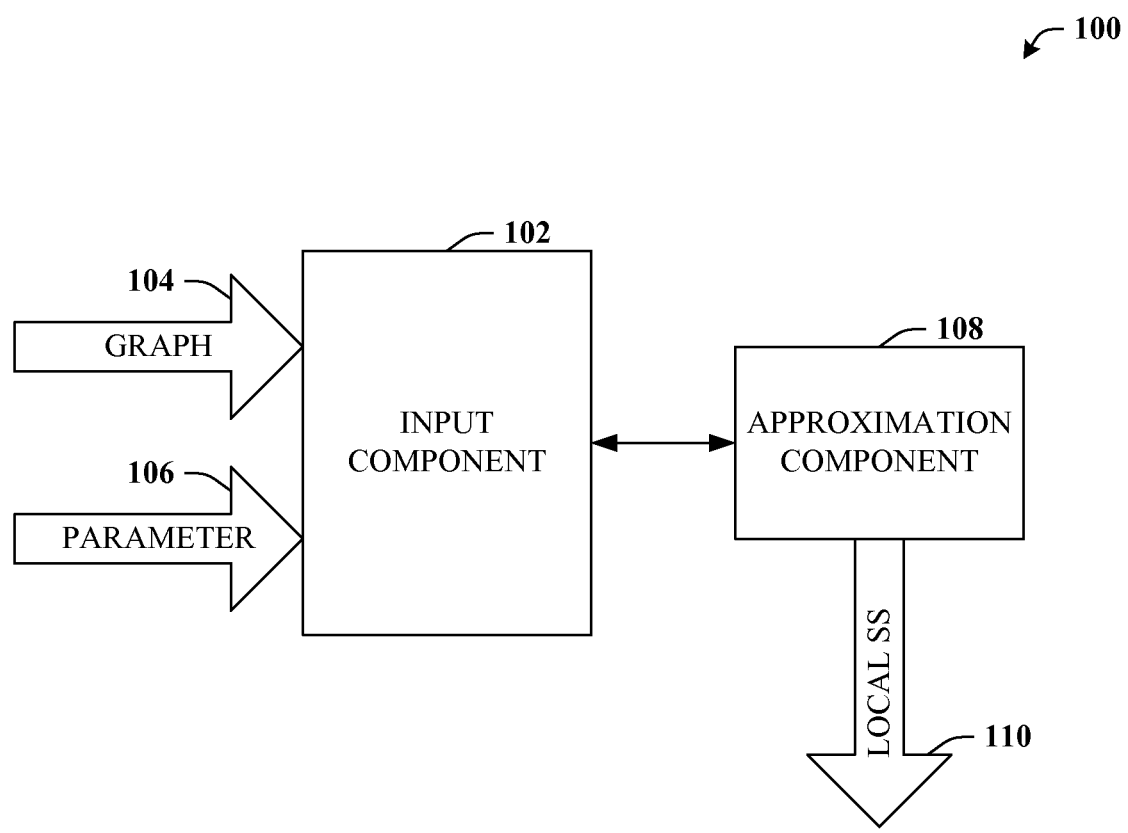
FIG. 1 illustrates a block diagram of a computer-implemented system that can determine local contributions to a rank of a vertex in a directed graph.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The terms "node" and "vertex," as used herein are intended to relate to a directed graph and can in many cases be used interchangeably.

Referring now to the drawing, with reference initially to FIG. 1, computer implemented system 100 that can determine local contributions to a rank of a vertex in a directed graph is depicted. Generally, system 100 can include input component 102 that can receive graph 104 and parameter 106, which can be denoted as $\delta \in (0,1)$. Typically, graph 104 is a directed graph in which each node or vertex in graph 104 can be representative of, for example, a web page, and an edge can be representative of a link (e.g., hyperlink) from one web page to another. In such a case, graph 104 can be a directed graph of the entire web. It is to be appreciated, however, that graph 104 can be a type of graph other than a web- or net-based graph such as a host graph or a domain graph for a social network or a computer related social network applications. In the case where graph 104 depicts a social network, the vertex can be, for example, representative of a contact or member of the social network and an edge can be representative of a relationship between two disparate members and/or a degree of influence of one member upon another.

Generally, graph 104 can include a very large set of vertices as well as a supporting set of vertices for each vertex in graph 104. For example, in the case in which a vertex, v, represents a web page, any other web page, vertex u, that includes a link to v can be said to be a member of the supporting set of v, with the link represented in graph 104 by an edge between u and v. For instance, since u provides a link to v, u then contributes to a ranking (e.g., PageRank) of the importance of v, and is thus a member of the supporting set of v. The ranking or PageRank of v is often determined by, e.g. a webcrawler that examines link structure on the web, and can be utilized by a search engine to establish an importance of v when returning query results. Accordingly, based upon these determinations, an analysis of whether or not v should be included in the search results can be made as well as v's relative position in the search results. Appreciably, u can be a member of a supporting set for other vertices simultaneously (e.g., by providing a hyperlink to other web page) just as other vertices apart from u can exist in the supporting set of v. Thus, the supporting set of v can be defined as a set of vertices that each contribute to the rank of v. In some cases, however, the supporting set can be refined somewhat to only include those vertices that contribute a certain amount to the rank of v. For example, the supporting set can include only those vertices that contribute a minimum fraction of parameter 106 to the rank of v.

System 100 can also include approximation component 108 that can examine a local subset of vertices in graph 104 in order to determine local supporting set 110. For example, whereas the supporting set can potentially include virtually any node in the graph 104, and, therefore, can conceivably require an examination of all nodes in order to identify, local supporting set 110 of a vertex, v, can include only those vertices that support v and are local to v. Hence, local supporting set 110 for a vertex can be a local set of vertices that each contributes a minimum fraction of parameter 106 to a rank of the vertex, wherein the local set of vertices is local to the vertex.

According to an aspect of the claimed subject matter, approximation component 108 can adaptively examine the local subset in order to identify local supporting set 110. For example, approximation component 108 can adaptively examine the local (e.g. local to the vertex) subset of all vertices in graph 104 by way of a pushback feature. The pushback feature can add a fraction of a value stored in the vertex to a scalar variable stored in each of the local subset of vertices that points to the vertex (e.g., has an edge to the vertex). Accordingly, approximation component 108 can adaptively examine the local subset in a time that is bounded by a sum of in-degrees of the local subset of vertices from which the pushback feature is employed. Moreover, it is possible that the approximation component 108 need only examine about $O(1/\epsilon)$ vertices of the local subset in order to identify the local supporting set 110 rather than examining all vertices in the entire graph 104. Appreciably, $\epsilon$ can be an error parameter that determines an accuracy of a rank approximation. Hence, approximation component 108 can arrive at a sufficiently accurate local supporting set 110 in a more efficient manner than conventional systems in terms of resource utilization, and can do so more quickly, allowing new ways to leverage this information.

It should be understood that in addition to identifying, storing, and/or outputting local supporting set 110, approximation component 108 can also compute, store, and/or output a local rank of the vertex based upon rank contributions from local supporting set 110. For example the rank contribution from each of the vertices in the local supporting set 110 can be aggregated (either weighted or unweighted) to provide an approximate rank of the vertex for the entire graph 104. In accordance with the foregoing, it should be appreciated that the approximation component 108 can be employed for approximating PageRank contribution vectors. For example, approximation component 108 can provide an approximation algorithm for finding the supporting set of a given vertex. For instance, approximation component 108 can give a local algorithm that returns a set containing the $\epsilon$-contributing set (e.g., supporting set 110) of the vertex and at most $O(1/\epsilon)$ nodes from $\epsilon/2$-contributing set of the vertex.

Hence, at most only $O(1/\epsilon)$ pushback operations need be most $O(1/\delta)$ pushback operations. In addition a local algorithm can be provided by approximation component 108 for solving the following problem: If there are k nodes which contribute a $\rho$-fraction to the PageRank of a given vertex, find a set of k nodes which contribute at least $(\rho-\epsilon)$-fraction to the PageRank of the vertex. In this case, it can be shown that at most $O(k/\epsilon)$ pushback operations are necessary. It should be appreciated and understood that these results can lead to a new, efficient local solution for giving a lower bound on the PageRank of a target web page (e.g., vertex), by examining a relatively small neighborhood of that web page.

In accordance with an aspect of the claimed subject matter, the supporting sets of web-pages determined by approximation component 108 can be employed to detect link or web spammers. As noted supra, web spammers are malicious users that improve their rank in search engines by manipulating link structure, rather than by improving the content of their web pages. The main way to detect web spam is based on the content of the web pages, but this can be very costly. Moreover, if it is desired to rank web pages for the purpose of assigning priority during a web crawl, some additional information about the web spam may be needed to be extracted without yet having complete information on the content of the pages. Hence, it can be useful to design ways for detecting web spam based on link structure rather than content. One such way of employing link structure is to use the local computation of the supporting set (e.g., local supporting set 110) to detect web spammers, potentially in at least two different ways, a supervised learning approach and an unsupervised learning approach, both of which are further detailed with reference to FIG. 3 infra.

In another aspect, finding the supporting set of a web page can have applications in social network analysis. For example, since the directed edges of a social network can be employed to capture the influence of nodes on each other, approximation component 108 in a manner similar to that described herein can find the nodes that are most influential for a specified node in the social network. However, in the interest of concise explanation, and to allow for ready comprehension of the claimed subject matter, what follows is an implementation that relates specifically to a computer-based network with a particular practical application of detecting link spam. Thus, while described in a particular context, it should be readily appreciated that the claimed subject matter can relate to numerous other applications.

By way of introduction, local computation of contribution sets (e.g., local supporting set 110) can be considered. In particular, we consider the following graph-theoretic primitive: Given a webgraph, G, a vertex v in G, and a parameter (e.g., parameter 106), $\delta \in (0,1)$, compute the set of all vertices each contributing at least a $\delta$ fraction to the PageRank of v. This set can be referred to as the $\delta$-contributing set of v.

To this end, the contribution PageRank vector of v can be defined to be the vector whose entries measure the contributions of every vertex to the PageRank of v. Recall that for a webgraph G=(V,E) and a teleportation constant (or restart probability) $\alpha$, the personalized PageRank vectors can define a matrix $PRM_\alpha$: The u-th row of $PRM_\alpha$ is the personalized PageRank vector of u. The PageRank of a vertex v is then the sum of the v-th column. In other words, the PageRank of a vertex in a webgraph can be viewed as the sum of the contributions to the vertex from the personalized PageRank vectors of all vertices in the webgraph. In this view, we can refer to the v-th column as the contribution PageRank vector, or simply, the contribution vector, of v.

Accordingly, an efficient, local algorithm for computing an $\epsilon$-approximation to this contribution vector can be provided. The algorithm can adaptively explore the vertices local to v based on a time-reverse formula that we derive for the personalized PageRanks. We prove that the number of the vertices which are examined is no more than $O(1/\epsilon)$. Examining a vertex can include utilizing a "pushback" feature. To pushback on a vertex u, a fraction of a number stored at u can be added to a scalar variable stored at every vertex w that points to u. Hence, the number of vertices that are examined can be bounded by the number of pushback operations that are applied. Appreciably, the running time necessary to achieve these results can then be bounded by the sum of the in-degrees of the pushbacked vertices.

This notion of ε-approximation of contribution vectors is stronger than that which was used previously. For example, the maximum component-wise error of the difference between the contribution vector of a vertex v and its ε-approximation is at most an ε fraction of the PageRank of v. For an ε-approximate personalized PageRank vector, the error for entry w could be of order $d_w ε$, where $d_w$ is the out-degree of w. With this weaker notion of ε-approximation, of certain earlier work gave an algorithm with running time O(log n/ε). The complexity was later improved to O(1/ε). It can be proposed that the complexity dependency of the in-degrees of our solutions could be necessary due to the fact that we use the stronger notion of approximation. Had the stronger notion of approximation been used for personalized PageRank, the running time of all previous work would depend on the total out-degrees of the pushed vertices.

However, by using applications of the claimed subject matter for approximating contribution vectors, we give an approximation algorithm to our primitive defined above. Explicitly, we give a local algorithm that returns a set containing the δ-contributing set of v and at most O(1/δ) vertices from the δ/2-contributing set of v. Thus, one or more procedures or algorithms described herein can perform at most O(1/δ) pushback operations. We also give a local algorithm for solving the following problem: If there are k vertices which contribute a ρ-fraction to the PageRank of v, find a set of k vertices which contribute at least (ρ−ε)-fraction to the PageRank of v. In this case, we prove that our algorithm needs at most O(k/ε) pushback operations. Additionally, the disclosed results can lead to a new, efficient local algorithm for estimating the PageRank of a target vertex, by, for example, examining a relatively small neighborhood of that vertex.

It should be appreciated that the web can be modeled by a directed graph G=(V, E), where V are webpages and a directed edge (u→v)∈E represents a hyperlink in u that references v. Although the web graph is often an unweighted graph, our discussion can be extended to weighted models. Let A denote the adjacency matrix of G. For each u∈V, let $d_{out}(u)$ denote the out-degree of u and let $d_{in}(u)$ denote the in-degree of u. Let $D_{out}$ be the diagonal matrix of out-degrees.

For a teleportation constant α, the PageRank vector $pr_α$ can be defined to satisfy the following equation:

$$pr_α = α·1 + (1−α)·pr_α·M, \quad (1)$$

where M can be the random walk transition matrix given by $M=D_{out}^{-1}A$ and 1 is the row vector of all 1's (always of a proper size). The PageRank of a page u is then $pr_α(u)$. When there is no danger of confusion, the subscript α may be omitted in what follows.

Similarly, the personalized PageRank vector of a page u∈V, ppr(α, u), satisfies the following equation.

$$ppr(α,u) = α·e_u + (1−α)·ppr(α,u)·M, \quad (2)$$

where $e_u$ is the row unit vector whose u-th entry is equal to 1. Let $PRM_α$ denote the (personalized) PageRank matrix, whose u-th row can be the personalized PageRank vector ppr(α, u). The (global) PageRank vector $pr_α$ can then be $1·PRM_α$, the sum of all the personalized PageRank vectors. The contribution vector cpr(α, v) can be the v-th column of $PRM_α$. If c=cpr(α, v) is the contribution vector for v, then we can denote by c(S) the total contribution of the vertices in S to the PageRank of v. In particular, we have $c(v)=pr_α(v)$ and $c(u)=ppr_α(u→v)$, the contribution of u to v given by the (u, v)th entry of $PRM_α$.

Computation of PageRank contributions can be described as follows. An approximation of the contribution vector c=cpr (α, v) of vertex v can be provided. As one definition for approximate contribution, a vector is an ε-approximation of the contribution vector c=cpr(α, v) if c̃≧0 and for all u:

$$c(u) − ε·pr_α(v) ≤ c̃(u) ≤ c(u).$$

A vector c̃ is an ε-absolute-approximation of the contribution vector c=cpr(α, v) if c̃≧0 and for all u:

$$c(u) − ε ≤ c̃(u) ≤ c(u).$$

Clearly, an ε-approximation of cpr(α, v) is an (ε·$pr_α$(v))-absolute-approximation of cpr(α, v). In the algorithm below, we will focus on the computation of an ε-absolute-approximation of the contribution vector of a vertex. To compute the ε-approximation of the contribution vector of a vertex v, we assume $pr_α$(v) is known.

The support of a non-negative vector (c̃), Supp(c̃), is the set of all indices whose entries in c̃ are strictly positive. The vector c has a canonical ε-absolute-approximation. Let c̄ denote the vector $$c̄(u) = \begin{cases} c(u) & \text{if } c(u) > ε \\ 0 & \text{otherwise.} \end{cases}$$

Clearly, c̄ is the ε-absolute-approximation of C with the smallest support. Moreover, $\|c̄\|_1 ≤ \|c\|_1$ and thus, $|Supp(c̄)| ≤ \|c\|_1/ε$. The described local algorithm can thus be employed to find an approximation c̃ of c which has a similar support structure to that of c̄.

At a high level, the local algorithm can be though of in the following way. It is well known that for each α, the personalized PageRank vector which satisfies Equation (2) supra also satisfies:

$$ppr(α, u) = α \sum_{i=0}^{\infty} (1−α)·(e_u · M^t). \quad (3)$$

The contribution of u to v is the $$ppr_α(u → v) = ppr(α, u)·e_v^T \quad (4)$$

$$= \left( α \sum_{t=0}^{\infty} (1−α)·(e_u · M^t) \right)·e_v^T \quad (5)$$

$$= e_u · \left( α \sum_{t=0}^{\infty} (1−α)·(M^t · e_v^T) \right). \quad (6)$$

We can compute the contribution of u to v based on Equation (5). We can refer to this approach as the time-forward calculation of $ppr_α(u→v)$. Recall that $e_u·M^t$ is the t-step random walk distribution starting from u. In the time-forward calculation, we can emulate the random walk from u step by step and add up the contribution of the walk distribution to every vertex scaled by the power sequence of $(1−α)^t$. By speeding up the computation via proper approximation, we can approximately update the random walk distribution. One can then obtain the approximate contribution of u to v from this approximate personalized PageRank vector. This is one basic idea behind some previous methods for personalized PageRank approximations. However, without knowing in advance for which vertices u it is the case that $ppr_α(u→v)>ε$, one may have to examine too many vertices to obtain a good approximation of cpr(α, v).

To overcome this difficulty, the local contribution methods and architectures set forth herein can use the time-reverse calculation of cpr(α, v) suggested by Equation (6). This equation implies that $$cpr(\alpha, v) = \alpha \sum_{t=0}^{\infty} (1-\alpha) \cdot (M^t \cdot e_v^T). \quad (7)$$

We start with $e_v$ and iteratively compute $M^t \cdot e_v^T$. We will properly round the small entries to zero to make our algorithm local and fast. It should be noted that the $M^T$ may no longer be Markov, as the sum of each column many no longer be equal to 1. In the time-forward direction, M can be a Markov matrix. Hence the time-reverse calculation of cpr(α, v) is no longer an emulation of the random walk starting from v.

Equation (7) can also enable one to compute the contribution vector to a subset S of vertices of v, which is equal to cpr(α, S)=$\sum_{v \in S}$ cpr(α, v). Thus, let $e_S = \sum_{v \in S} e_v$. Then, $$cpr(\alpha, S) = \alpha \sum_{t=0}^{\infty} (1-\alpha) \cdot (M^t \cdot e_S^T) \quad (8)$$

To further liberalize notation, for any non-negative vector s, we can define:

$$cpr(\alpha, s) = \alpha \sum_{t=0}^{\infty} (1-\alpha) \cdot (M^t \cdot s^T) \quad (9)$$

Turning now to the local computation and its analysis, the theorem below describes our ApproximateContributions for computing an ε-absolute-approximation of the contribution vector of a target vertex v. We will give an upper bound on the number of vertices examined by our methods or architectures, which typically depends on $pr_\alpha(v)$, ε, and α, but is otherwise independent of the number of vertices in the graph. The algorithm performs a sequence of pushback operations from some sequence of vertices (to be detailed infra), each of which can be performed on a single vertex, and requires time proportional to the in-degree of that vertex. Therefore, an upper bound we can be placed on the number of pushback operations performed by the disclosed subject matter, rather than the total running time of the various computations, which can depend on the in-degrees. This is also an upper bound on the support of the resulting approximation c̃.

As a proposed theorem (Theorem I), the ApproximateContributions (v, α, ε, $p_{max}$) can have the following properties. The input can be a vertex v, two constants α and ε can be in the interval [0, 1], and $p_{max}$ can be a real number. The applications described herein can produce a vector c̃ such that 0≤c̃≤c, and either:

1. c̃ is an ε-absolute approximation of cpr(α, v), or
2. $\|\tilde{c}\|_1 \geq p_{max}$.

The number of pushback operations, P, performed and the support of c̃ satisfy the following bound $$|Supp(\tilde{c})| \leq P \leq \frac{\min(pr_\alpha(v), p_{\max})}{\alpha \varepsilon} + 1.$$

The proof of the above can be based on a series of facts which we describe infra. The starting point is the following observation, which is easy to verify from Equation (9). For any vector s, $$cpr(\alpha, s)M^T = cpr(\alpha, sM^T). \quad (10)$$

We can further derive the following equation, $$cpr(\alpha, s) = \alpha s + (1-\alpha) \cdot cpr(\alpha, s)M^T \quad (11)$$
$$= \alpha s + (1-\alpha) \cdot cpr(\alpha, sM^T).$$

This can be conceived as the transposed version of equations used in earlier work to compute approximate personalized PageRank vectors. Very naturally, we can use it to compute approximate contribution vectors.

The ApproximateContributions (v, α, ε, $p_{max}$) can maintain a pair of vectors p and r, starting with the trivial approximation p=$\vec{0}$ and r=$e_v$, and can apply a series of pushback operations that increase $\|p\|_1$ while maintaining the invariant p+cpr(α, r)=cpr(α, v). Each pushback operation can select a single vertex u, move an α fraction of the mass at r(u) to p(u), and can then modify the vector r by replacing $r(u)e_u$ with $(1-\alpha)r(u)e_u M^T$. Note that the sum $\|r\|_1 + \|p\|_1$ may increase or decrease during this operation. We will define the pushback operation more formally below, and then verify that each pushback operation does indeed maintain the invariant. pushback (u): Let p=p' and r'=r, except for these changes: 1. p'(u)=p(u)+ar(u). 2. r'(u)=0. 3. For each vertex w such that w→u: R'(w)=r(w)+(1-α)r(u)/$d_{out}$(w).

This can be conceived as the transposed version of equations used in earlier work to compute approximate personalized PageRank vectors. Very naturally, we can use it to compute approximate contribution vectors.

Lemma 1 (Invariant): Let p' and r' be the result of performing pushback(u) on p and r. If p and r satisfy the invariant p'+cpr(α, r')=cpr(α, v), then p' and r' satisfy the invariant p'+cpr(α, r')=cpr(α, v).

Proof of Lemma 1 can be as follows. After the pushback operation, we have, in vector notation, $$p' = p + \alpha r(u)e_u.$$

$$r' = r - r(u)e_u + (1-\alpha)r(u)e_u M^T.$$

We can now apply equation (11) to $r(u)e_u$ to show that p+cpr(α, r)=p'+cpr(α, r'):

$$cpr(\alpha, r) = cpr(\alpha, r - r(u)e_u) + cpr(\alpha, r(u)e_u)$$
$$= cpr(\alpha, r - r(u)e_u) + \alpha r(u)e_u + cpr(\alpha, (1-\alpha)r(u)e_u M^T)$$
$$= cpr(\alpha, r - r(u)e_u + (1-\alpha)r(u)e_u M^T) + \alpha r(u)e_u$$
$$= cpr(\alpha, r') + p' - p.$$

During each pushback operation, the amount of mass in p increases by αr(u). This amount of mass can never increase above $\|cpr(\alpha, v)\|_1$, which can be equal to $pr_\alpha(v)$. By performing pushback operations only on vertices where r(u)≥ε, we can ensure that the mass in p increases by a significant amount at each step, which allows us to bound the number of pushes required to compute an ε-absolute-approximation of the contribution vector. This can be one idea behind the solutions of the ApproximateContributions. For example, ApproximateContributions(v, α, ε,$p_{max}$)

1. Let p=$\vec{0}$, and r=$e_v$.
2. While r(u)>ε for some vertex u:
   (a) Pick any vertex u where r(u)>ε.
   (b) Apply pushback (u).
   (c) If $\|p\|_1$>$p_{max}$, halt and output $\tilde{c}$=p.
3. Output $\tilde{c}$=p.

These acts can be implemented by maintaining a queue containing those vertices u satisfying r(u)≧ε. Initially, v can be the only vertex in the queue. At each step, we can take the first vertex u in the queue, remove it from the queue, and then perform a pushback operation from that vertex. If the pushback operation raises the value of r(x) above ε for some in-neighbor x of u, then x can be added to the back of the queue. This typically continues until the queue is empty, at which point all vertices satisfy r(u)<ε, or until $\|p\|_1$≧$p_{max}$. We now show that this computation has the properties described by Theorem I.

Proof of Theorem I. Let T be the total number of push operations performed, and let $p_t$ and $r_t$ be the states of the vectors p and r after t pushes. The initial setting of $p_0$=0 and $r_0$=$e_v$ satisfies the invariant $p_t$+cpr(α, $r_t$)=cpr(α, v), which is maintained throughout the described operations. Since $r_t$ is nonnegative at each step, the error term cpr(α, $r_t$) is also nonnegative, so we have cpr(α, v)−$p_t$≧0. In particular, this implies $\|p_t\|_1$≦$\|cpr(α, v)\|_1$=$pr_α(v)$.

Let $\tilde{c}$=$p_T$ be the vector output. When the computations terminate, we must have either $\|\tilde{c}\|_1$≧$p_{max}$ or $\|r_T\|_\infty$≦ε. In the latter case, the following calculation shows that $\tilde{c}$ is an ε-absolute-approximation of cpr(α, v).

$$\|cpr(\alpha,v) - \tilde{c}\|_\infty = \|cpr(\alpha, r_T)\|_\infty$$

$$\leq \|r_T\|_\infty$$

$$\leq \epsilon.$$

The fact that $\|cpr(α, r_T)\|_\infty$≦$\|r_T\|_\infty$ holds because $r_T$ is nonnegative and each row of M sums to 1.

The vector $p_{T-1}$ must have satisfied $\|p_{T-1}\|_1$<$p_{max}$, since the acts involved can decide to push one more time. We have already observed that $\|p_{T-1}\|$<$pr_α(v)$. Each push operation increased $\|p\|_1$ by at least αε, so we have $$\alpha\epsilon(T-1) \leq \|p_{T-1}\|_1 \leq \min(\|cpr(\alpha,v)\|_1, p_{max}).$$

This gives the desired bound on T, which is also an upper bound on the number of vertices in the support of $\tilde{c}$.

It should be appreciated that it is possible to perform a push operation on the vertex u, and to perform the necessary queue updates, in time proportional to $d_{in}(u)$. The actual running time for the computations can depend on the in-degree of the vertices from which the pushes occur. To compute an ε-approximation of cpr(α, v), we can assume that $pr_α(v)$ is known. We can then call ApproximateContributions(v, α, ε·$pr_α(v)$, $pr_α(v)$).

Corollary 2 (ε-Approximation of contribution vectors). Given $pr_α(v)$, an ε-approximation of cpr(α, v), can be computed with $$\frac{1}{\alpha\varepsilon}+1$$

pushback operations.

We also observe, using Equation (8), our calculations can be easily adapted to compute an ε-absolute-approximation and ε-approximation of cpr(α, S) for a group S of vertices with a similar bound on the number of pushback operations. This could be a useful function for link-spam analysis.

Next we can look at computing sets of major contributors to the rank of a vertex, such as supporting sets (e.g., local supporting set 110). Accordingly, we can employ the local algorithm, acts and/or architectures described supra to build the supporting set, which can be a set of vertices that contribute significantly to the PageRank of a target vertex. For a vertex v, let $π_v$ be the permutation that orders the entries cpr(α, v) from the largest to the smallest. We can break ties arbitrarily, or according to the PageRank of the vertices, or according to their distances to v. There are several natural notions of supporting sets. For example, top k contributors: the first k pages of $π_v$.
δ-significant contributors: $\{u | ppr_α(u \to v) > \delta\}$.
ρ-supporting set: a set S of pages such that $ppr_α(S \to v)$ ≧ ρ·$pr_α(v)$.

Let $k_ρ(v)$ be the smallest integer such that $ppr_α(π_v(1:k_ρ(v)) \to v)$≧ρ·$pr_α(v)$. Clearly the set of the first $k_ρ(v)$ pages of $π_v$ can be the minimum size ρ-supporting set for v. Also, we can define $ρ_k(v)$=$ppr_α(π_v(1:k)) \to v)/pr_α(v)$ to be the fraction of PageRank contributed to v by its top k contributors.

Next we can describe approximating supporting sets. Without precisely computing cpr(α, v), it can be difficult or even impossible to identify these significant contributors of v. Thus, we will consider approximation of these sets of contributors. For a precision parameter ε, we define the following.

ε-precise top k contributors: a set of k pages that contains all pages whose contribution to v is at least $ppr_α(π_v(k) \to v)$+ε·$pr_α(v)$, but no page with contribution to v less than $ppr_α(π_v(k) \to v)$−ε·$pr_α(v)$.

ε-precise δ-significant contributors: a set that contains the set of δ-significant contributors and is contained in the set of (δ−ε)-significant contributors.

In this setting, we can assume that $pr_α(v)$ is known ahead of time.

Now we can introduce a second theorem, Theorem II: A set of ε-precise top k contributors of a vertex v can be found with 1/αε+1 pushback operations.

Proof of Theorem II can be as follows. Call $\tilde{c}$=ApproximateContributions(v, α, ε·$pr_α(v)$, $pr_α(v)$). Let C=Supp($\tilde{c}$). If |C|>k, then return the vertices with the top k entries in $\tilde{c}$; otherwise, return C together with k−Supp($\tilde{c}$) arbitrarily chosen vertices not in C. Consider a page u with cpr(u, v)≧cpr($π_v r(k)$, v)+ε·$pr_α(v)$. Clearly u∈C because $\tilde{c}(u)$≧cpr($π_v(k)$, v), implying $\tilde{c}$ (u) is among the top k entries in $\tilde{c}$. On the other hand, $\tilde{c}$ ($\_π_v(j)$) is at least cpr($π_v(k)$, v)−ε·$pr_α$ (v) for all j∈[1:k]. Thus, each of the vertices with the top k entries in $\tilde{c}$ must contribute at least cpr($π_v(k)$, v)−ε·$pr_α(v)$ to v.

Theorem III: An ε-precise δ-significant contributing set of a vertex v can be found with 1/αε+1 pushback operations.

Proof of Theorem III can be as follows. Call $\tilde{c}$=ApproximateContributions(v, α, ε·$pr_α(v)$, $pr_α(v)$) and return the vertices whose entries in $\tilde{c}$ is at least (δ−ε)·$pr_α(v)$. Clearly, the set contains the δ-contributing set of v and is contained in the (δ)-supporting set of v. Moreover, the number of pages not in the δ-supporting set that are included is at most 1/(δ−ε).

Continuing the discussion, we consider the computation of approximate ρ-supporting sets. We give two different algorithms, depending on whether we want to find a supporting set with a fixed number of vertices and a nearly largest contribution, or a supporting set with a fixed contribution on the smallest possible number of vertices.

Theorem IV: Given an integer k, a set of k vertices that is a $(\rho_k-\epsilon)$-supporting set for v can be found with $k/\alpha\epsilon+1$ pushback operations.

Proof of Theorem IV: compute $\tilde{c}$=ApproximateContributions(v, $\alpha$, $\epsilon pr_\alpha(v)/k$, $pr_\alpha(v)$). Let $S_k$ be the set of k vertices with the highest values in c, and let $\tilde{S}_k$ be the set of k vertices with the highest values in $\tilde{c}$. The set $\tilde{S}_k$ meets the requirements of the theorem, since we have $$\tilde{c}(\tilde{S}_k) \geq c(\tilde{S}_k) - k(\epsilon pr_\alpha(v)/k)$$
$$\geq \rho_k \cdot pr_\alpha(v) - \epsilon \cdot pr_\alpha(v)$$
$$= pr_\alpha(v)(\rho_k - \epsilon).$$

Theorem V: Assume we are given $\rho$ but not $k_\rho$. A set of at most $k_\rho$ vertices that is a $(\rho-\epsilon)$-supporting set for v can be found with $O(k_\rho \log k_\rho/\alpha\epsilon)$ pushback operations.

Now we turn to the Proof of Theorem V. One challenge here is that we do not know $k_\rho$, so we need to use a binary search procedure to find a proxy for $k_\rho$. Thus, we will proceed in two phases. In the first phase, we choose various values of k, starting with k=1, and compute $\tilde{c}$=ApproximateContributions (v, $\alpha$, $\epsilon pr_\alpha(v)/k$, $pr_\alpha(v)$). As in Theorem IV supra, let $\tilde{S}_k$ be the set of k vertices with the highest values in $\tilde{c}$, which we know satisfies $\tilde{c}(\tilde{S}_k) \geq (\rho_k-\epsilon)$. If we observe that $\tilde{c}(\tilde{S}_k) > (\rho-\epsilon)$, then we can double k and repeat the procedure. If we observe that $\tilde{c}(\tilde{S}_k) \geq (\rho-\epsilon)$, then we halt and proceed to the next phase, and let $k_1$ be the value of k for which we halt. We must have $k_1 \geq 2k_\rho$, since we are guaranteed to halt if $k \geq k_\rho$.

Let $k_0=k_1/2$ be the value of k from the step before the first phase halted. In the second phase, we can perform a binary search within the interval $[k_0, k_1]$ to find the smallest integer $k_{min}$ for which $\tilde{c}(\tilde{S}_{k_{min}}) \geq (\rho-\epsilon)$, which must satisfy $k_{min} \geq k_\rho$. We output $\tilde{S}_{k_{min}}$.

Each time we call the subroutine $\tilde{c}$=ApproximateContributions(v, $\alpha$, $\epsilon pr_\alpha(v)/k$, $pr_\alpha(v)$), it requires $k/\alpha\epsilon+1$ push operations. In the first phase we call this subroutine with a sequence of k values that double from 1 up to at most $2k_\rho$, so the number of push operations performed can be $O(k_\rho/\alpha\epsilon+\log k_\rho)$. In the second phase, the binary search can make at most $\log k_\rho$ calls to the subroutine, with k set to at most $2k_\rho$ in each step, so the number of push operations performed can be $O(k_\rho \log k_\rho/\alpha\epsilon+\log k_\rho)$. The total number of push operations performed in both phases thus can be $O(k_\rho \log k_\rho/\alpha\epsilon)$.

Next, we can consider local estimation of PageRank. Up to this point have assumed that the PageRank of the target vertex is known. We now consider the problem of computing a lower bound on the PageRank of a vertex using local computation.

A natural lower bound on the PageRank $pr_\alpha(v)$ is provided by the contribution to v of its top k contributors, $p_k = cpr(\pi_v(1:k), v)$. The next theorem shows we can efficiently certify that $pr_\alpha(v)$ is approximately as large as $p_k$ without prior knowledge of $pr_\alpha(v)$ or $p_k$. This should be contrasted with the computations from the previous section, for which we needed to know the value $pr_\alpha(v)$ in order to set $\epsilon$ to obtain the stated running times.

Consider now Theorem VI: Given k and $\delta$, we can compute a real number p such that $$p_k(1+\delta)^{-2} \leq p \leq pr_\alpha(v),$$

where $p_k = cpr(\pi_v(1:k), v)$, by performing $10 k \log(k/\alpha\delta)/\alpha$ pushback operations.

Proof of Theorem VI. Fix k and $\delta$, choose a value of p, and compute $\tilde{c}$=ApproximateContributions(v, $\alpha$, $\epsilon$, p) with $\epsilon=\delta p/k$. The number of pushback operations performed is at most $$1+p/\alpha\epsilon = 1+p/\alpha(\delta p/k) = 1+10k/\alpha.$$

When the computations halt, we either have $\|\tilde{c}\|_1 \geq p$, in which case we have certified that $pr_\alpha(v) \geq p$, or else we have $\|\tilde{c}-cpr(\alpha, v)\|_\infty \leq \delta p/k$, in which case we have certified that $p_k \leq (1+\delta)p$, by the following calculation.

$$p_k = cpr(\pi_v(1:k),v) \leq \tilde{c}(\pi_v(1:k),v)+(\delta p/k)k \leq p+\delta p.$$

We can now perform a binary search over p in the range $[\alpha, k]$. So let $p_{low}$ be the largest value of p for which we have certified that $pr_\alpha(v) \geq p$, and let $p_{high}$ be the smallest value of p for which we have certified that $p_k < (1+\delta)p$. We perform binary search until $p_{high} \leq p_{low}(1+\delta)$, which requires at most $\log(k/\alpha\delta)$ steps. Then, $p_{low}$ has the property described in the theorem, $$pr_\alpha(v) \geq p_{low} \geq p_{high}(1+\delta)^{-1} \geq p_k(1+\delta)^{-2}.$$

The total number of pushback operations performed during the calls to ApproximateContributions during the binary search is at most $10 k \log(k/\alpha\delta)/\alpha$. In contrast, it would appear more difficult to provide an upper bound on $pr_\alpha(v)$ without examining a significant fraction of the input graph.

Given the above, we can now provide scratch work for a support bound, utilizing the following notation. Let $M_\alpha$ be the PageRank matrix, such that $ppr(\alpha, v)=1_v M_\alpha$ and $cpr(\alpha, v)=1_v M^*_\alpha$.

$$ppr(\alpha, x \to y) = \langle xM\alpha, y \rangle.$$

$$c_v(u) = ppr(\alpha, 1_u \to 1_v) = \langle 1_u M\alpha, 1_v \rangle.$$

$$c_v(S) = ppr(\alpha, 1_S \to 1_v) = \langle 1_S M\alpha, 1_v \rangle.$$

Now we can provide additional information relating to the support bound. Here is a stronger bound on the size of the support of $\tilde{c}$. Modify the computations slightly so that when in performs a pushback operation, it leaves $\epsilon/2$ units of mass on the vertex from which it pushes. This increases the running time bound for the algorithm by a factor of 2. But then we know that $r(x) \leq \epsilon/2$ at each vertex in $Supp(\tilde{c})$. In the following proposition, we use this fact to give a family of bounds on the size of $Supp(\tilde{c})$.

Consider now the following proposition. Let $M=M_\alpha$ be the PageRank matrix such that $sM=pr_\alpha(s)$. Let $S=Supp(r)$. For any nonnegative vector z, we have the following upper bound on S, $$pr_\alpha(z \to 1_S) \leq \frac{2}{\epsilon} pr_\alpha(z \to 1_v).$$

Proof of the above proposition can be as follows. We know that $cpr(\alpha, r) \leq cpr(\alpha, v)$, which can also be written $rM^* \leq 1vM^*$. Then, $$\langle zM, 1_v \rangle = \langle z, 1_v M^* \rangle$$
$$\geq \langle z, rM^* \rangle$$
$$= \langle zM, r \rangle$$
$$\geq (\epsilon/2)\langle zM, 1_S \rangle$$

In the second line we needed z to be nonnegative, and in the last line we needed zM to be nonnegative, which is true whenever z is nonnegative.

This proposition stands for the notion that for any starting vector z, the amount of PageRank $ppr(\alpha, z)$ on the S is at most 2/ε times the PageRank of v. In particular, if we let z=1$_v$, then we obtain a bound on the amount of global PageRank on the set S, $$pr_\alpha(S) \leq \frac{2}{\varepsilon} pr_\alpha(v).$$

If we make the pessimistic assumption that $pr_\alpha(x)=\alpha$ for each x∈Supp($\tilde{c}$), then this reduces to the same bound we knew before, $$|Supp(\tilde{c})| \leq \frac{2}{\varepsilon} pr_\alpha(v)/\alpha\varepsilon.$$

Another interesting choice for z is the stationary distribution π of the random walk. We have ppr(α, π)=π, and so we obtain:

$$\pi(S) \leq \frac{2}{\varepsilon}\pi(v).$$

What would be quite beneficial here is for there to exist a nonnegative vector z such that ppr(α, z) is proportional to the in-degree of each vertex, because that would give us a bound on the volume of S. For most directed graphs, it is theorized that such a vector will not necessarily exist.

In our performance analysis, we give a bound of $pr_\alpha(v)/(\alpha\varepsilon)+1$ on the total number of pushback operations needed for our computation to succeed. In a pushback at a vertex u, we update the entry for u in the p vector as well as entries in r for all vertices that point to u. As a result, the overall time complexity of our computations are proportional to the total in-degrees of the sequences of vertices that we pushback from.

Given what has been described supra, a few remarks can now be made regarding dependency on in-degrees. One may wonder whether we can eliminate this dependency on the in-degree of these vertices. We now argue that this dependency may be unavoidable. First of all, in order to perform the timereverse computation, each vertex must have a list of its in-neighbors, that is, the set of vertices that point to it. The question here is whether we can compute an ε-approximation of the contribution vector with time bounded by $O(pr_\alpha(v)/(\alpha\varepsilon))$, as the support of the approximate vector that we obtain is at most $pr_\alpha(v)/(\alpha\varepsilon)+1$.

Imagine v has s in-neighbors $v_1, \ldots, v_s$. each having out degree d such that $(1-\alpha)/d\leq\varepsilon$. Now suppose there is one neighbor $v_i$ all of whose out-links point back to the set $v_1, \ldots, v_s$, while every other $v_j$, for j≠i, points to a sufficiently large clique which has only one link pointing to v. The contribution of vertex $v_i$ to v is at least $(1-\alpha)/d+(d-1)(1-\alpha)^2/d$. Now suppose $(1-\alpha)/d+(d-1)(1-\alpha)^2/d>\varepsilon$ and s>>d. The contribution of $v_j$, for j≠i, to v is less than ε.

Consider a local algorithm which starts at v that can only explore the graph from v. Without the global knowledge of the graph, the algorithm typically can not distinguish $v_i$ from the rest of the in-neighbors of v without accessing all its in-neighbors! Thus, it generally must take at least s steps to compute an ε-absolute approximation of cpr(α, v). We note that this style of argument can be used to show, that if one uses the stronger notion of approximation proposed in this paper, then substantially any local algorithm for personalized PageRank approximation must depend on the out-degrees of the influence set.

Now we can examine contribution vectors via the time-reverse chain. As noted earlier, the matrix $M^T$ in the time-reverse formula of Equation (7) may not be Markov. This suggests the following question: for each Markov matrix M over a vertex set V, is there a Markov matrix M' over V such that, for every v, the personalized PageRank vector of v defined by M' is co-linear with the contribution vector of v defined by M? Moreover, if the answer is affirmative, how quickly can such an M' be computed it from M?

It should be underscored that even if M has a stationary distribution, the traditional time-reverse Markov chain does not necessarily satisfy the condition requested in the paragraph above. Consider the following definition (Time-reverse chain): Given a Markov chain M with transition probability $m_{ij}$, and stationary distribution π, the reverse-chain is the one R with transition probability $r_{ij}=\pi(j)m_{ji}/\pi(i)$.

In other words, let Π be the matrices whose (i,j)-th entry is $\pi(j)/\pi(i)$, then $R=\Pi\cdot*M^T$, where ·* is the component-wise multiplication of two matrices (similar to Matlab-type applications). The time-reverse chain has the following properties.

R has the same stationary distribution as M,
for all i, k, and t, consider the t-step random walk starting from i in M and k in R, then $$e_i M^t (e_k)^T = \left(\frac{\pi(k)}{\pi(i)}\right) e_k R^t (e_i)^T \quad (12)$$

Recall $e_i M^t(e_k)^T$ can be equal to the probability that k is reached by t-step random walk from i. Let $ppr_\alpha^M (u\to v)$ denote the personalized PageRank contribution from u to v in a Markov chain M.

Now, Theorem VII can be provided. Suppose a Markov chain M has a stationary distribution π and R is its time-reverse chain. Then, $$ppr_\alpha^M(u \to v) = \left(\frac{\pi(v)}{\pi(u)}\right) ppr_\alpha^R(u \to v). \quad (13)$$

Proof of Theorem VII: It follows from Equations (5) and (12). Thus, mathematically, if the stationary exists, we can compute the contribution vector of M by computing the personalized PageRank vector of its reverse chain. However, for local approximating contribution vectors, the time-reverse chain might be weaker than the time-reverse formula that we have derived above. First, that formula does not need the condition that M has a stationary distribution. Because of the diagonal rescaling in Equation (12), we need not directly use the local personalized PageRank approximation algorithm of previous work to compute the contribution vector. But for Markov chain whose stationary distribution is almost uniform, the use of reverse-chain can be faster in local contribution vector computation.

Finally, a review a local computation of queries. The computation of the PageRank and significant contributors of a particular vertex can be viewed as a query problem: We are given a query vertex and are asked to compute an approximate answer. In various applications of web graphs, we may need to answer other forms of queries.

[Q1]: Given two vertices u and v, and a parameter ε, determine whether $ppr_\alpha(u\to v)>\varepsilon$, and if the answer is yes, compute $ppr_\alpha(u\to v)$ to precision ε.

[Q1']: Given two vertices u and v, and a parameter ε, determine whether $ppr_\alpha(u\to v)>\varepsilon\cdot pr_\alpha(v)$, and if the answer is yes, compute $ppr_\alpha(u\to v)$ to precision $\varepsilon\cdot pr_\alpha(v)$.

[Q2]: Given a set S and a vertex v, and a parameter ε, determine whether $ppr_\alpha(S\to v)\geq\delta\cdot pr_\alpha(v)$.

Figure 2:
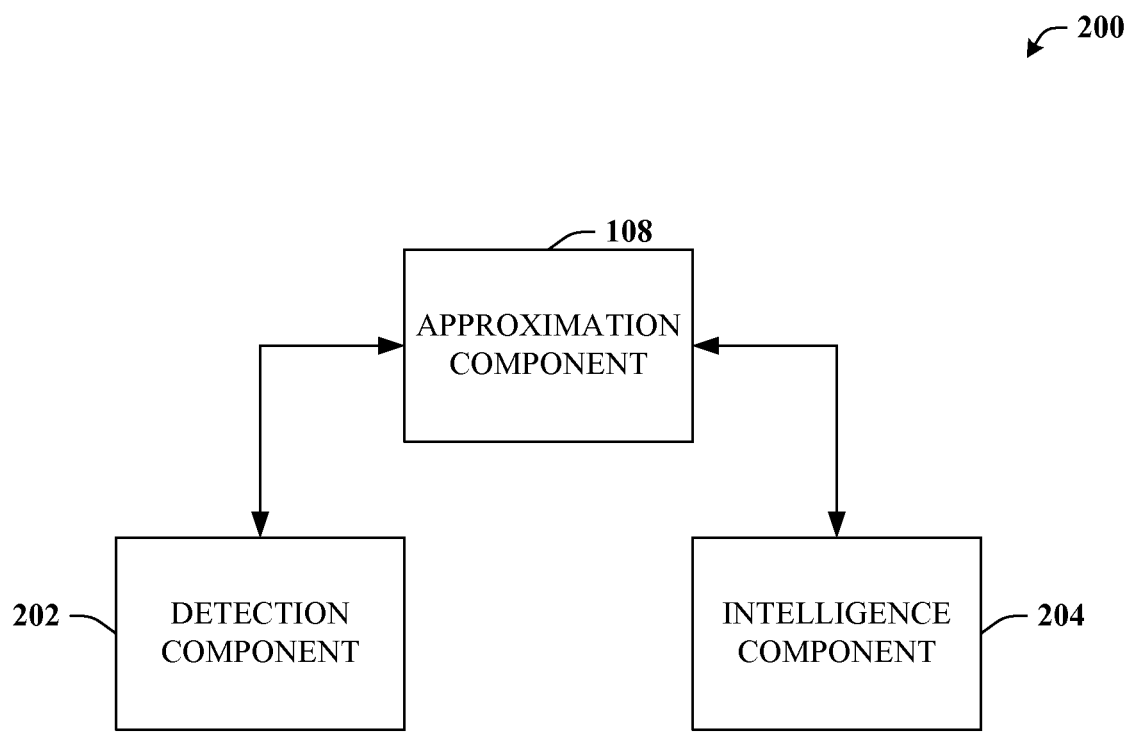
FIG. 2 is a block diagram of a computer-implemented system that can determine local contributions to a rank of a vertex in a directed graph further including a detection component and/or an intelligence component.

Turning briefly to FIG. 2, computer-implemented system 200 that can determine local contributions to a rank of a vertex in a directed graph is illustrated. Typically, system 200 can include approximation component 108 that can examine a local subset of vertices in order to determine local supporting set 110 as substantially described supra. In addition, system 200 can further include detection component 202 that can employ local supporting set 110 in order to identify link spam. It is to be appreciated that detection component 202 can also be employed to detect various features of influence between nodes in a social network.

System 200 can also include intelligence component 204 that can provide for various inferences and/or determinations. In particular, intelligence component 204 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic— that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 3:
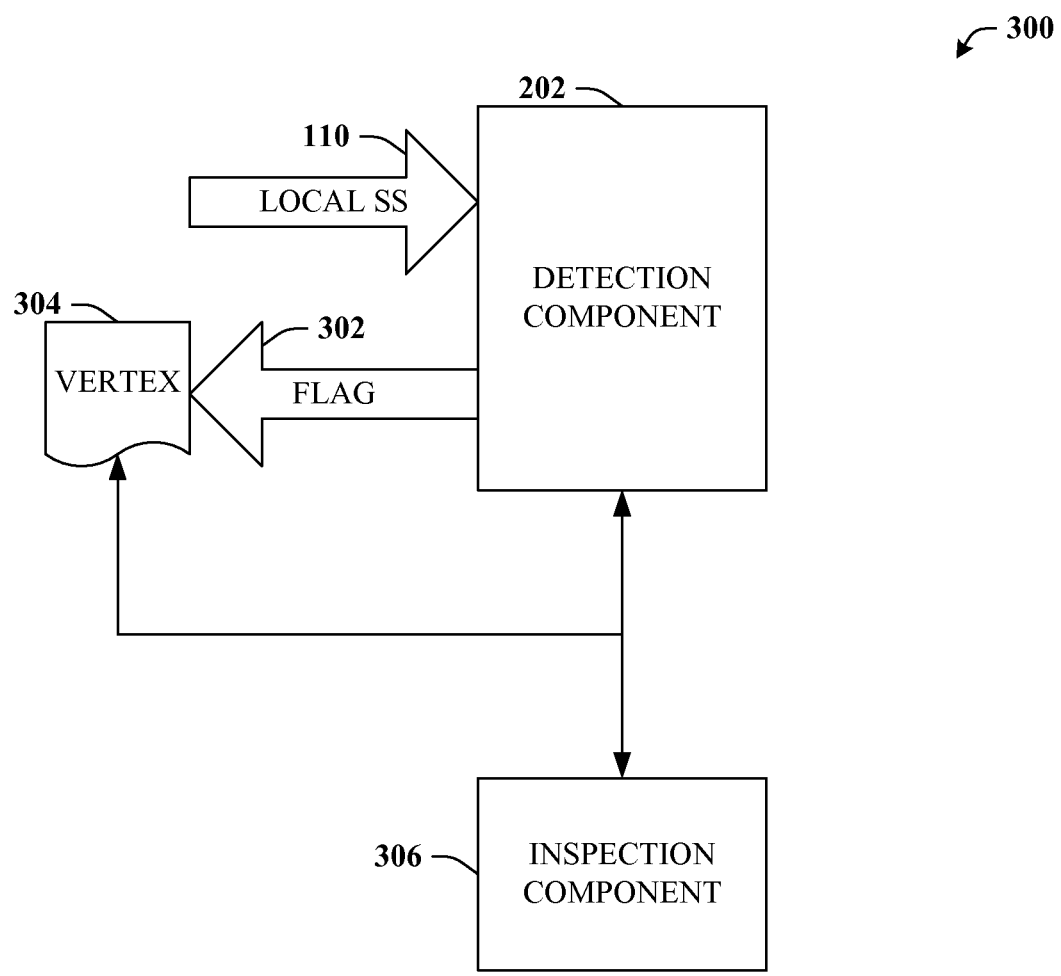
FIG. 3 illustrates a block diagram of a computer-implemented system that can identify link spam.

Referring now to FIG. 3, computer-implemented system 300 that can examine a local supporting set for the purpose of detecting link spam. Generally, system 300 can include detection component 202 that can examine local supporting set 110 in order to flag (e.g., utilize flag 302) vertex 304. For example, if vertex 304 is suspected of link spam, detection component 202 can flag vertex 304. Otherwise, e.g., when link spam is not suspected, detection component 202 generally will not flag vertex 304.

According to an aspect of the claimed subject matter, detection component 202 can identify potential link spam associated with vertex 304 based upon the size of local supporting set 110. In more detail, if local supporting set 110 is relatively small (e.g. there are relatively few vertices included in local supporting set 110), such a condition is indicative of link spam. On the other hand, if local supporting set 110 is not relatively small, then the vertex will typically not be suspected of link spam, so vertex 304 will not be flagged in that case.

System 300 can also include inspection component 306 that can examine contents (e.g. the content of the node, including for instance the context of a web page) of flagged vertex 304 in order to verify the existence or non-existence of link spam. While examining the contents of vertex 304 can be expensive in terms of resource utilization, it should be appreciated that such examination by inspection component 306 need only be performed on vertex 304 once detection component has indicated vertex 304 is suspicious by way of flag 302. Accordingly, there are at least two approaches that can be used to determine the presence of link spam, both of which are further detailed infra.

Supervised Learning Approach—In this approach, after flagging a web-page as a web spammer, the pages in the supporting set of the spam page and can be identified and marked as suspicious. These suspicious web-pages may need to be examined based on their other features to see if they are web spam or not. For example, one can process their content to detect if they are web spam. In this case, inspection component 306 can be utilized.

Unsupervised Learning Approaches—In this approach, the characteristics of the local supporting set of a web page as features for determining whether or not it is spam. For example, among high PageRank web-pages, it can often be reasonably assumed that the size of the supporting sets for a spam web-page is typically much smaller than the size of the supporting set of a nonspam web-page. Since the supporting sets can be computed locally (e.g., local supporting set 110), and in time proportional to the size of the supporting set, the necessary computation can be carried out efficiently. In this scenario, inspection component 306 need not be utilized and/ or implemented.

Figure 4:
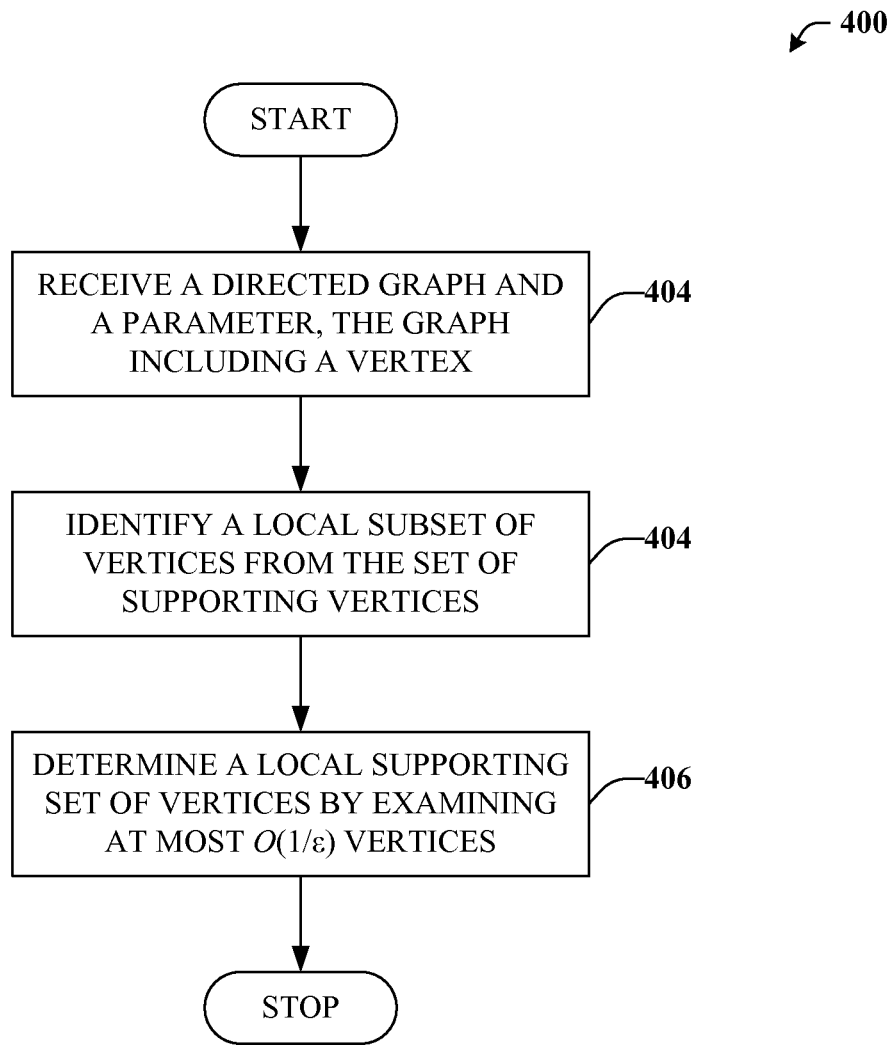
FIG. 4 depicts an exemplary flow chart of procedures defining a computer implemented method for determining local contributions to a rank of a vertex in a directed graph.
Figure 5:
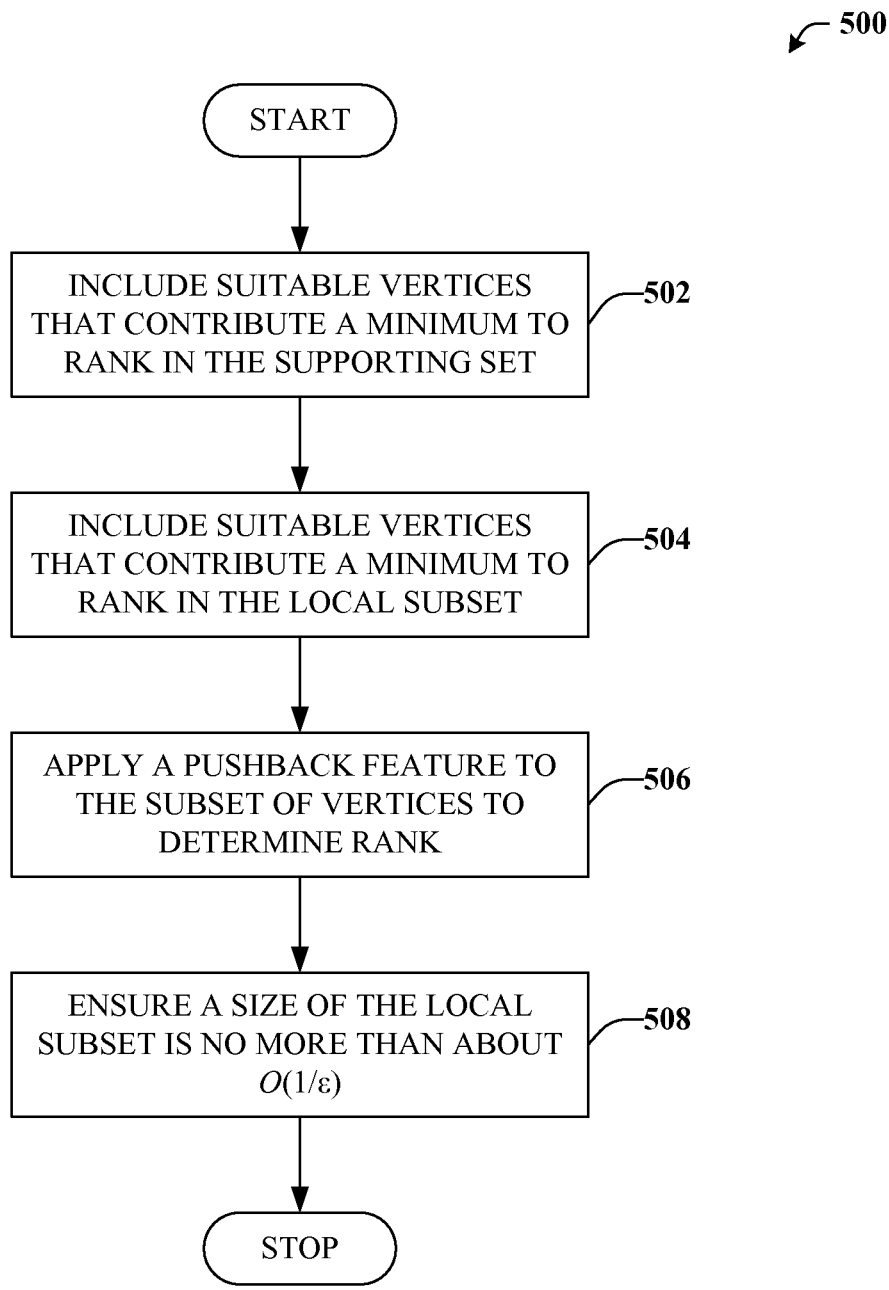
FIG. 5 is an exemplary flow chart of procedures defining a computer implemented method for determining local contributions to a rank of a vertex in a directed graph.
Figure 6:
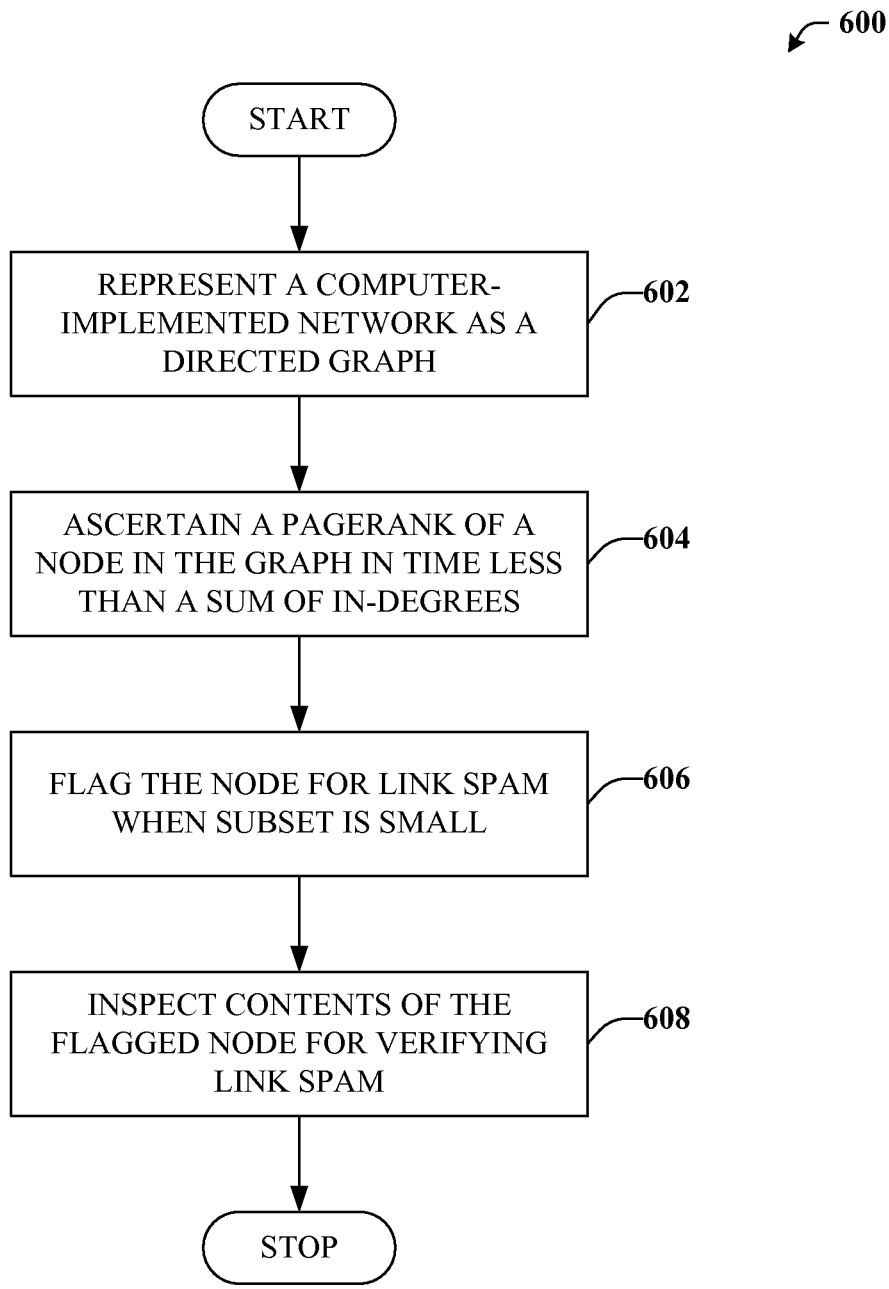
FIG. 6 illustrates an exemplary flow chart of procedures defining a computer implemented method for detecting link spam in a computer-implemented network in a manner that is independent of a size of the network.

FIGS. 4, 5, and 6 illustrate methodologies in accordance with the claimed subject matter. While, for purposes of simplicity of explanation, the methodologies is shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 4, example computer implemented method 400 for determining local contributions to a rank of a vertex in a directed graph can be found. In general, at reference numeral 402, a directed graph and a parameter can be received. The parameter can be denoted as, e.g., $\delta \in (0,1)$ and the graph can be a graph in which each node or vertex can be representative of, for example, a web page, and an edge can be representative of a link (e.g., hyperlink) from one web page to another. In addition, the vertices and edges can be representative of structure in other social networks.

At reference numeral 404, a local subset of vertices can be examined. At reference numeral 406, a local supporting set of vertices from among the local subset can be determined or identified by examining at most $O(1/\epsilon)$ vertices of the local subset. An in-depth description of aspects and features relating to determining the local subset has been provided supra with reference to FIG. 1.

With reference now to FIG. 5, example computer implemented method 500 for utilizing a pushback feature for determining local contributions to a rank of a vertex in a directed graph is provided. Generally, at reference numeral 502, the set of supporting vertices identified at act 404 can be constructed to include only those vertices within the graph that contribute to a rank of the vertex of at least a minimum fraction of the parameter. At reference numeral 504, the local subset of vertices determined at act 406 can be constructed to include only those vertices that are local to the vertex and that contribute to a rank of the vertex of at least a minimum fraction of the parameter. Appreciably, local vertices can be determined from among those vertices included in the set of supporting vertices identified at acts 404 or 502.

At reference numeral 506, a pushback feature can be applied to each local vertex in the local subset of vertices in order to determine the rank of the vertex. At reference numeral 508, it can be ensured that a size of the local subset of vertices is less than or equal to about $O(1/\epsilon)$. Consequently, $O(1/\epsilon)$ can also be the upper limit on the number of pushback operations that need be applied at act 506.

Referring to FIG. 6, example method 600 for detecting link spam in a computer-implemented network in a manner that is independent of a size of the network is illustrated. Typically, at reference numeral 602, a computer-implemented network can be represented as a directed graph. For example, each node of the directed graph can represent a web page in the network, usually the Internet. Likewise, a link from one web page to another web page can be represented as an edge between nodes in the directed graph.

At reference numeral 604, a PageRank of a node in the directed graph and/or a web page of the network can be ascertained in a time that is less than or equal to a sum of in-degrees of a local subset of vertices. Accordingly, the time necessary for ascertaining the PageRank is not a function of the size of the full graph, but rather a local subset of the graph. At reference numeral 606, the node can be flagged for suspected link spam when a number of vertices included in the local subset of vertices is relatively small, e.g. small relative to another non-suspect node in the graph of a similar PageRank. At reference numeral 608, the content of the flagged node/web page can be inspected for verifying whether the suspect node exemplifies link spam.

Figure 7:
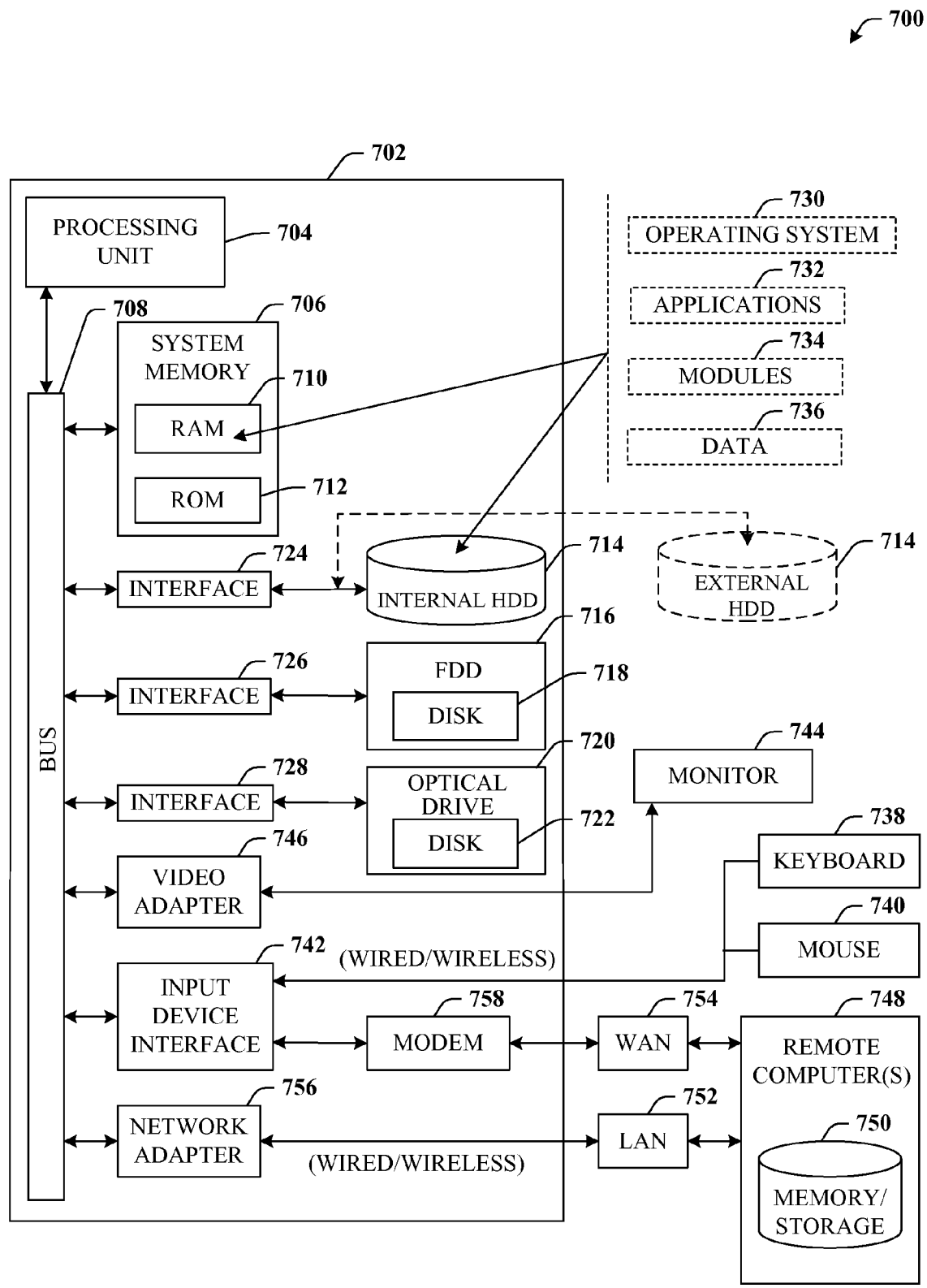
FIG. 7 illustrates a block diagram of a computer operable to execute the disclosed architecture.

Referring now to FIG. 7, there is illustrated a block diagram of an exemplary computer system operable to execute the disclosed architecture. In order to provide additional context for various aspects of the claimed subject matter, FIG. 7 and the following discussion are intended to provide a brief, general description of a suitable computing environment 700 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the claimed subject matter includes a computer 702, the computer 702 including a processing unit 704, a system memory 706 and a system bus 708. The system bus 708 couples to system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g. reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the claimed subject matter can be implemented with various commercially available operating systems or combinations of operating systems.

A user can enter commands and information into the computer 702 through one or more wired/wireless input devices, e.g. a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g. the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
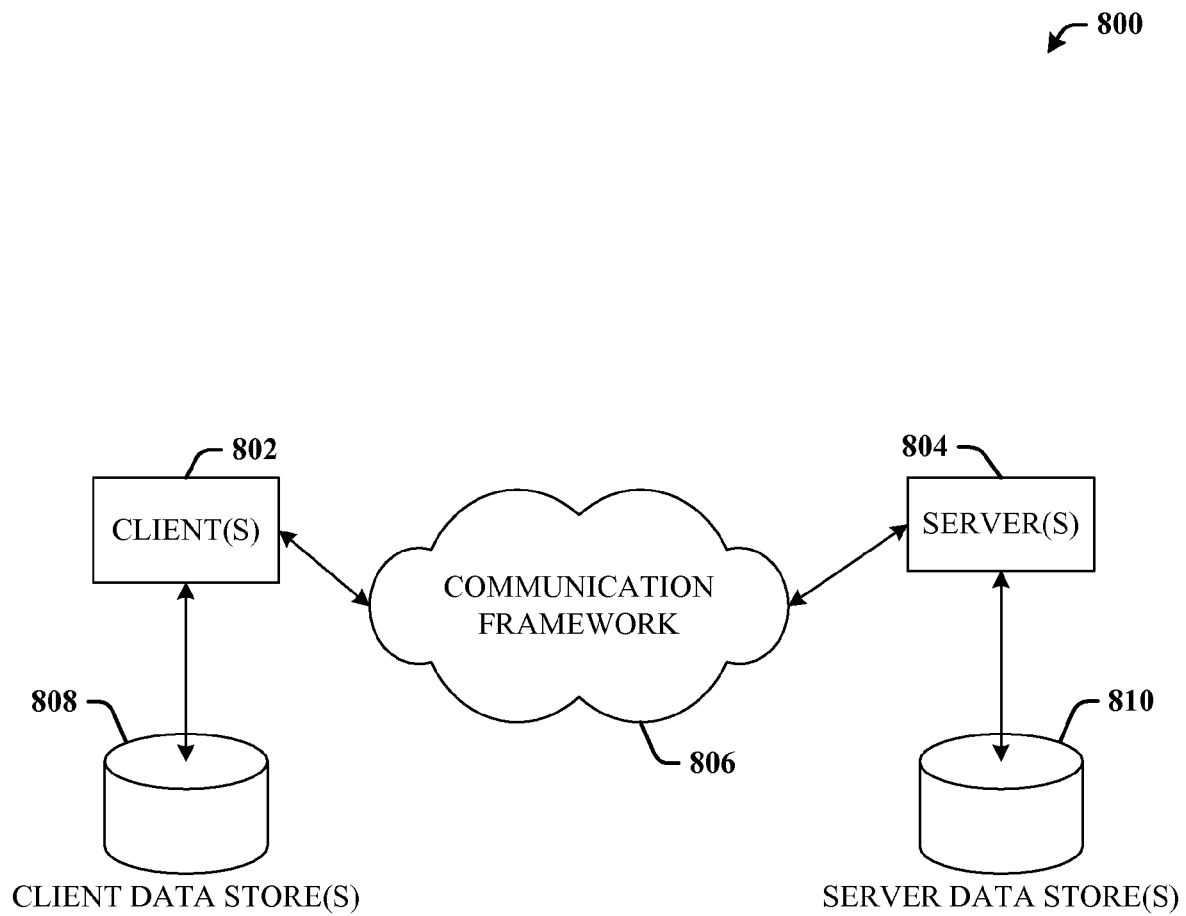
FIG. 8 illustrates a schematic block diagram of an exemplary computing environment.

Referring now to FIG. 8, there is illustrated a schematic block diagram of an exemplary computer compilation system operable to execute the disclosed architecture. The system 800 includes one or more client(s) 802. The client(s) 802 can be hardware and/or software (e.g., threads, processes, computing devices). The client(s) 802 can house cookie(s) and/or associated contextual information by employing the claimed subject matter, for example.

The system 800 also includes one or more server(s) 804. The server(s) 804 can also be hardware and/or software (e.g., threads, processes, computing devices). The servers 804 can house threads to perform transformations by employing the claimed subject matter, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that determines local contributions to a rank of a vertex in a directed graph, the system comprising:
   memory;
   at least one processor for executing components stored in the memory, the components including:
     an input component that receives a directed graph and a parameter, wherein the directed graph includes a vertex and a supporting set of vertices; and
     an approximation component that examines a local subset of vertices included in the directed graph and calculates an $\epsilon$-absolute-approximation of a contribution vector associated with the vertex and at least the local subset of vertices in order to determine a local supporting set of vertices, wherein the $\epsilon$-absolute-approximation is:
       greater than or equal to the contribution vector minus $\epsilon$, wherein the $\epsilon$ includes an error parameter associated with an accuracy of an approximation of the rank of the vertex; and
       less than or equal to the contribution vector.

2. The system of claim 1, wherein the supporting set of vertices includes a set of vertices that each contributes a minimum fraction of the parameter to the rank of the vertex.

3. The system of claim 1, wherein the local supporting set includes a local set of vertices that each contributes a minimum fraction of the parameter to the rank of the vertex, the local set of vertices is local to the vertex in the directed graph.

4. The system of claim 1, wherein the approximation component examines the local subset in order to identify the local supporting set, each local vertex included in the local subset points to the vertex.

5. The system of claim 1, wherein the approximation component examines the local subset by way of a pushback feature and determines an upper bound on a number of times to invoke the pushback feature.

6. The system of claim 5, wherein the pushback feature adds a fraction of a value stored in the vertex to a scalar variable stored in each local vertex that points to the vertex, each local vertex is included in the local subset of vertices.

7. The system of claim 5, wherein the approximation component examines the local subset in a time that is bounded by a sum of in-degrees of the local subset of vertices from which the pushback feature is employed.

8. The system of claim 1, wherein the approximation component examines at most $O(1/\epsilon)$ vertices of the local subset in order to identify the local supporting set.

9. The system of claim 1, wherein the approximation component computes a local rank of the vertex based upon rank contributions from the local supporting set.

10. The system of claim 9, wherein the local rank is an approximation of a rank of the vertex for the directed graph.

11. The system of claim 1, further comprising a detection component that examines the local supporting set in order to flag the vertex as suspect, the vertex is flagged as suspect when the detection component identifies potential link spam with respect to the vertex.

12. The system of claim 11, wherein the detection component identifies potential link spam based upon a size of the local supporting set.

13. The system of claim 11, further comprising an inspection component that examines contents of the vertex flagged as suspect in order to verify a presence of link spam.

14. The system of claim 1, wherein the directed graph represents a computer network and the vertex is a web page in the computer-implemented network.

15. The system of claim 1, wherein the directed graph represents a social network and the vertex is a member of the social network.

16. The system of claim 1, further comprising a memory that stores the local supporting set.

17. A computer-implemented method for determining local contributions to a rank of a vertex in a directed graph, the method comprising:
   receiving, by at least one processor, a directed graph and a parameter, the directed graph including a vertex and a set of supporting vertices;
   identifying, by the at least one processor, a local subset of vertices from among the set of supporting vertices; and
   determining, by the at least one processor, a local supporting set of vertices from among the local subset of vertices based at least on:
     examining the local subset of vertices included in the directed graph;

calculating an ε-absolute-approximation of a contribution vector associated with the vertex and at least the local subset of vertices, wherein the ε-absolute-approximation is:

greater than or equal to the contribution vector minus ε, wherein the ε includes an error parameter associated with an accuracy of an approximation of the rank of the vertex; and less than or equal to the contribution vector.

18. The method of claim 17, further comprising at least one of the following acts:

including in the set of supporting vertices only those vertices within the directed graph that contribute to the rank of the vertex of at least a minimum fraction of the parameter;

including in the local subset of vertices only those vertices that are local to the vertex and that are included in the set of supporting vertices that contribute to a rank of the vertex of at least a minimum fraction of the parameter;

applying a pushback feature to each local vertex in the local subset of vertices in order to determine the rank of the vertex; and ensuring a size of the local subset of vertices is less than or equal to about $O(1/\epsilon)$.

19. A computer-implemented method for detecting link spam in a computer-implemented network in a manner that is independent of a size of the network, the method comprising:

representing a computer-implemented network as a directed graph;

ascertaining, by at least one processor, a PageRank of a node in the directed graph in a time that is less than or equal to a sum of in-degrees of a local subset of vertices based at least in part on calculating an ε-absolute-approximation of a contribution vector associated with the node and at least the local subset of vertices in order to determine a local supporting set of vertices, wherein the ε-absolute-approximation is:

greater than or equal to the contribution vector minus ε, wherein the ε includes an error parameter associated with an accuracy of an approximation of a rank of the vertex; and less than or equal to the contribution vector; and flagging, by the at least one processor, the node for suspected link spam when a number of vertices included in the subset of vertices is small relative to another non-suspect node in the directed graph of a similar PageRank as the PageRank of the node.

20. The method of claim 19, further comprising inspecting contents of the flagged node for verifying link spam.

\* \* \* \* \*